(12) United States Patent
Zou et al.

(10) Patent No.: US 8,019,122 B2
(45) Date of Patent: Sep. 13, 2011

(54) VEHICLE SIDE IMAGE RECOGNITION METHOD AND APPARATUS

(75) Inventors: Bo Zou, Shenyang (CN); Nan Wang, Shenyang (CN)

(73) Assignee: Alpine Electronics, Inc., Tokyo (JP)

( * ) Notice: Subject to any disclaimer, the term of this patent is extended or adjusted under 35 U.S.C. 154(b) by 935 days.

(21) Appl. No.: 11/962,018

(22) Filed: Dec. 20, 2007

(65) Prior Publication Data

US 2008/0158014 A1 Jul. 3, 2008

(30) Foreign Application Priority Data

Dec. 29, 2006 (CN) .......................... 2006 1 0156280

(51) Int. Cl.
*G06K 9/00* (2006.01)
(52) U.S. Cl. ........ 382/104; 382/103; 382/106; 382/107; 382/174; 340/933; 340/937; 348/148; 701/1
(58) Field of Classification Search .................. 382/104, 382/103, 106, 174; 340/933, 937; 348/148; 701/1
See application file for complete search history.

(56) References Cited

U.S. PATENT DOCUMENTS

| | | | | |
|---|---|---|---|---|
| 7,839,303 | B2 * | 11/2010 | Kumon et al. ................ | 340/937 |
| 2006/0204039 | A1 * | 9/2006 | Maemura et al. ............. | 382/104 |
| 2007/0154068 | A1 * | 7/2007 | Stein et al. .................... | 382/106 |
| 2008/0118149 | A1 * | 5/2008 | Fu et al. ........................ | 382/174 |

FOREIGN PATENT DOCUMENTS

| | | |
|---|---|---|
| CN | 101030256 | 2/2006 |
| JP | 08-329397 | 12/1996 |
| JP | 2003076987 | * 8/2001 |
| JP | 2003-076987 | 3/2003 |

OTHER PUBLICATIONS

Office Action from Chinese Patent Office dated Apr. 8, 2010 for Chinese Patent Application No. 200610156280.0 with English Translation; 20 pages.

* cited by examiner

*Primary Examiner* — Wesley Tucker
(74) *Attorney, Agent, or Firm* — Brinks Hofer Gilson & Lione (57) ABSTRACT

A vehicle side image recognition method and apparatus inputs images containing recognized vehicles captured by a camera apparatus; sorts images with the recognized vehicles located at left and right sides of the camera apparatus from the input images; performs vehicle side image recognition processing on the sorted images to acquire side image information of each of the recognized vehicles; and outputs the acquired side image information of each of the recognized vehicles. An assisted driving system may use the vehicle side image information to analyze the relative movement of an object vehicle and other vehicles more comprehensively, thus greatly improving the traveling security of a vehicle.

14 Claims, 6 Drawing Sheets

VEHICLE SIDE IMAGE RECOGNITION METHOD AND APPARATUS

The present application claims priority to Chinese Patent Application Number 2006-10156280.0, filed Dec. 29, 2006, the entirety of which is hereby incorporated by reference.

TECHNICAL FIELD

The invention relates to the field of vehicle image recognition, and particularly, to a method and apparatus for recognizing vehicle side images, which can be used for detecting vehicle headlight misrecognition and for predicting vehicle traveling security.

BACKGROUND

Side image information of other vehicles acquired by recognizing vehicle side images can enable an assisted driving system to understand another vehicle's traveling direction by analyzing the direction of the vehicle's side, and can enable the assisted driving system to analyze the relative movement between an object vehicle and another vehicle more comprehensively, thus greatly improving the traveling security of a vehicle.

Moreover, since there are similarities between the horizontal structure of the side of a vehicle and the horizontal structure of the vehicle front face and between the reflection of vehicle headlights from the side of a vehicle and other vehicle headlights in the nighttime, vehicle image recognition methods based on a vehicle's structure, profile, and headlights will frequently cause misrecognition of the position of the vehicle. Therefore, recognizing vehicle side images is helpful to reduce misrecognitions caused by a vehicle image recognition method in the above cases.

The existing recognition methods for recognizing vehicle side images mainly record side images of other vehicles located near the object vehicle through a camera placed on the side of the object vehicle. Then the wheels of another vehicle located to the side of the object vehicle are recognized based on the understanding that the recorded images of the two side wheels of another vehicle located to the side of the object vehicle should be in the same horizontal position, so that vehicles located to the side of the object vehicle are recognized.

However, we can deduce that these vehicle side recognition methods can only be used in vehicle recognition systems with a camera mounted on the side of the object vehicle, because the methods require that the two side wheels of a vehicle to be recognized are on the same horizontal line. These methods cannot provide a vehicle side image recognition function for use in front and side vehicle recognition systems.

BRIEF SUMMARY

The invention is proposed in view of the above problems, and an object of the invention is to provide a vehicle side image recognition method and apparatus, wherein an assisted driving system can analyze the relative movement between an object vehicle and other vehicles more comprehensively by using the vehicle side information provided by this method and apparatus, so as to greatly improve the traveling security of a vehicle.

Another object of the invention is to provide a vehicle side image recognition method and apparatus wherein misrecognition by the vehicle image recognition method can be reduced by using the vehicle side information provided by this method and apparatus.

Another object of the invention is to provide a vehicle headlight misrecognition detection method which uses the vehicle side information to detect vehicle headlight misrecognition.

Another object of the invention is to provide a vehicle traveling security prediction method which uses the vehicle side information to predict vehicle traveling security.

A vehicle side image recognition method according to one embodiment of the invention comprises:
inputting images containing recognized vehicles captured by a camera apparatus;
sorting images with the recognized vehicles located at left and right sides of the camera apparatus from the input images;
performing a vehicle side image recognition processing on the sorted images to acquire side image information of each of the recognized vehicles; and
outputting the acquired side image information of each of the recognized vehicles.

A vehicle side image recognition apparatus according to one embodiment of the invention comprises:
an input unit for inputting images containing recognized vehicles captured by a camera apparatus;
a sorting unit for sorting images with the recognized vehicles located at left and right sides of the camera apparatus from the input images;
a recognition processing unit for performing a vehicle side image recognition processing on the sorted images to acquire side image information of each of the recognized vehicles; and
an output unit for outputting the acquired side image information of each of the recognized vehicles.

A vehicle headlight misrecognition detection method according to an embodiment of the invention comprises:
inputting images of recognized vehicle headlights and images containing recognized vehicles captured by a camera apparatus;
acquiring coordinate information of the side image of each of the recognized vehicles based on the input images containing the recognized vehicles;
determining recognized vehicle headlights that are located in side image regions of the recognized vehicles based on the images of the recognized vehicle headlights and the coordinate information of the side image of each of the recognized vehicles; and
outputting the determined recognized vehicle headlights as misrecognized vehicle headlights.

A vehicle traveling security prediction method according to one embodiment of the invention comprises:
inputting images containing recognized vehicles captured by a camera apparatus mounted on an object vehicle, and a speed of the object vehicle relative to each of the recognized vehicles;
acquiring coordinate information of the side image of each of the recognized vehicle based on the input images containing the recognized vehicles;
calculating an angle of the object vehicle relative to each of the recognized vehicles located behind the object vehicle based on the coordinate information of the side image of each of the recognized vehicles;
determining recognized vehicles which are located behind the object vehicle and are more likely to collide with the object vehicle based on the calculated angles;
predicting a time period before each of the determined recognized vehicles collides with the object vehicle; and
outputting the determined recognized vehicles and the predicted time periods.

DETAILED DESCRIPTION OF THE DRAWINGS AND THE PRESENTLY PREFERRED EMBODIMENTS

Figure 1:
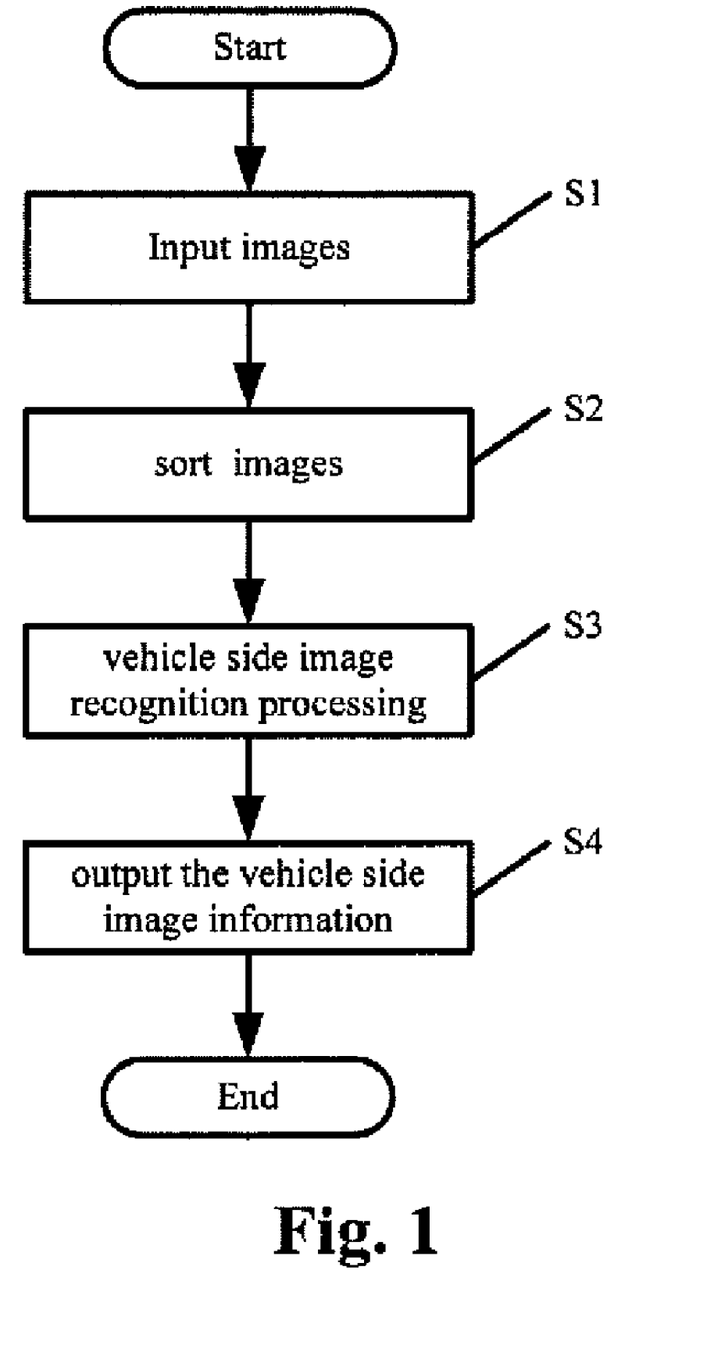
FIG. 1 is a flow chart of a vehicle side image recognition method according to an embodiment of the invention.

FIG. 1 is a flow chart of a vehicle side image recognition method according to an embodiment of the present invention. As shown in FIG. 1, in step S1, images are captured by a camera apparatus such as a TV video camera and the like mounted on an object vehicle are input, which images contain recognized other vehicles. For the convenience of description, the recognized other vehicles are referred to as the recognized vehicles in the following description.

In step S2, the input images are sorted into three kinds: (1) images with the recognized vehicles located directly in front of or directly behind the object vehicle; (2) images with the recognized vehicles located in the proximity of a vanishing line; and (3) images with the recognized vehicles located at the left and right sides of the object vehicle.

Next, in step S3, the images with recognized vehicles located at the left and right sides of the object vehicle are used to perform vehicle side image recognition processing on the recognized vehicles, to acquire side image information of the recognized vehicles. The vehicle side image recognition processing of the present invention will be described in detail in conjunction with FIG. 2.

Figure 3:
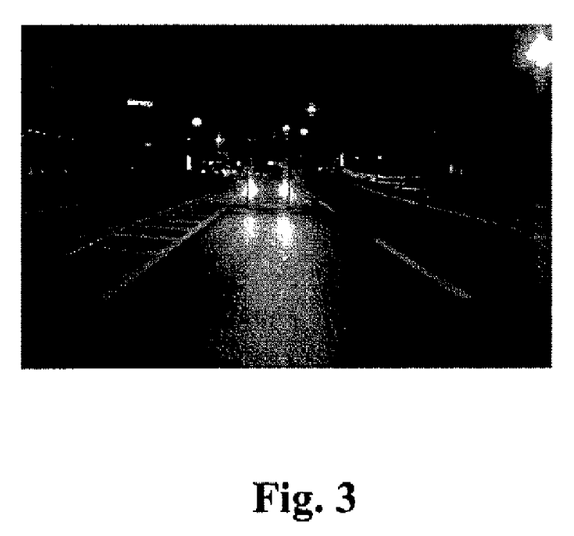
FIG. 3 shows an image containing a vehicle located directly behind the object vehicle.
Figure 4:
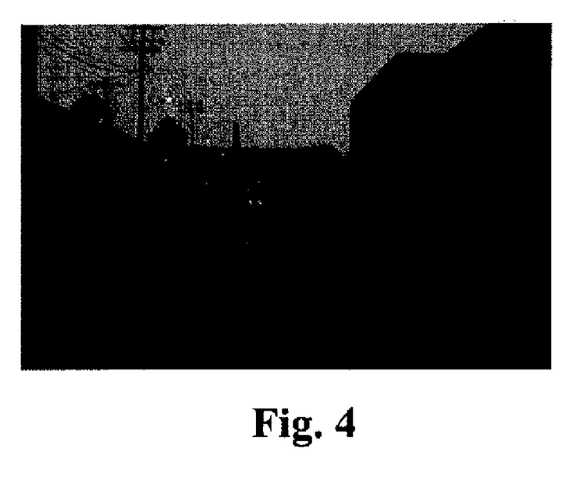
FIG. 4 shows an image containing a vehicle in the proximity of a vanishing line.

In this embodiment, as shown in FIG. 3, since there is no vehicle side seen in the image for vehicles located directly behind the object vehicle, vehicle side image recognition is not performed on vehicles located directly behind the object vehicle, nor on vehicles located in front of the object vehicle. Moreover, as shown in FIG. 4, since the area of a vehicle in the proximity of a vanishing line is relatively small in the image, the vehicle side is hard to see, so that if vehicle side image recognition is performed on this kind of vehicle, the error will be relatively large. In the present embodiment, vehicle side image recognition is not performed on a vehicle in the proximity of a vanishing line for this reason.

Finally, in step S4, the acquired side image information of the recognized vehicles is provided as an output.

Figure 2:
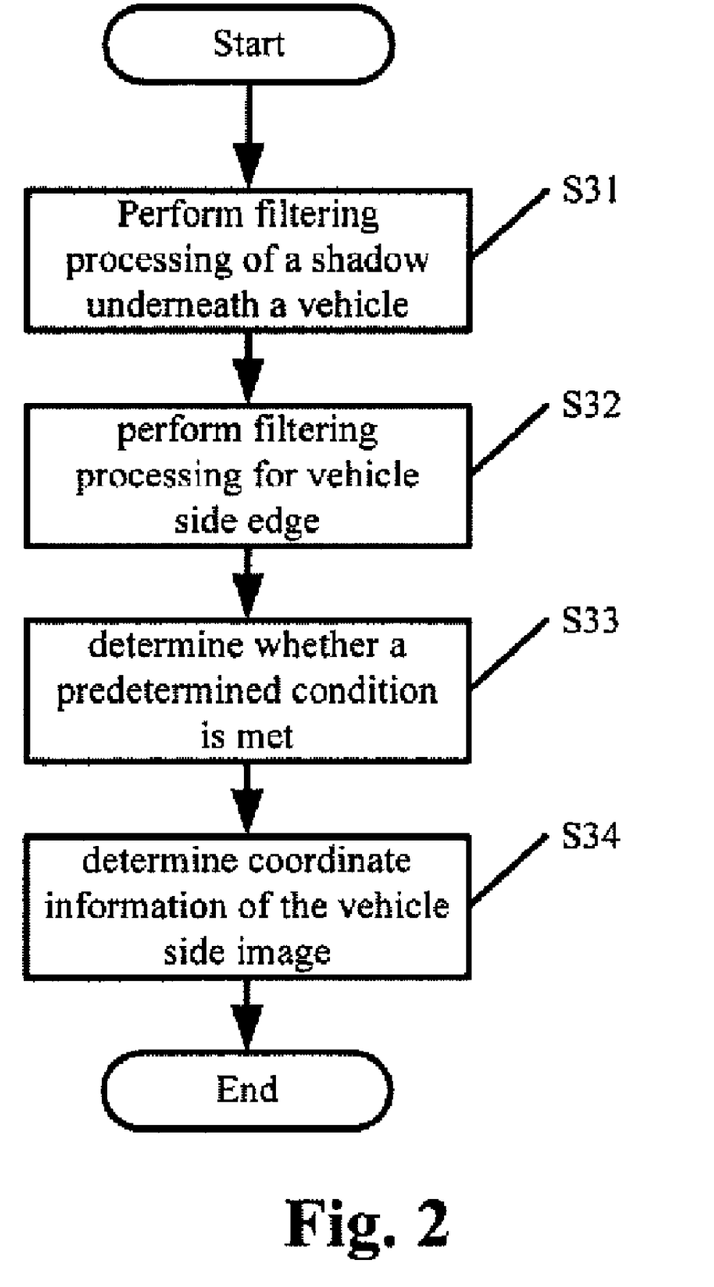
FIG. 2 is a flow chart of a vehicle side image recognition processing according to an embodiment of the invention.

FIG. 2 is a flow chart of vehicle side image recognition processing according to an embodiment of the present invention. First, in step S31, filtering processing for a shadow underneath a vehicle is performed on the sides of the recognized vehicles in an image to acquire the side shadow underneath a recognized vehicle, by using various known methods such as the method for determining a shadow underneath a vehicle disclosed in a Chinese patent application Serial No. 200610009379.8 (Published Application No. 101030256) titled "Method and Apparatus for Partitioning a Vehicle Image," filed on Feb. 28, 2006.

In step S32, an existing edge extracting method such as Sobel, Canny, etc. is used to perform filtering processing for vehicle side edges in the direction of the acquired side shadow underneath a vehicle in the image, to acquire the vehicle side edge of each of the recognized vehicles.

In step S33, it is judged whether the acquired side shadow underneath a vehicle and the vehicle side edge of each of the recognized vehicles meet the following conditions: whether or not the positions of the acquired side shadow underneath a vehicle and the vehicle side edge of each of the recognized vehicles are in the proximity of the position of the respective recognized vehicle, for example, whether or not the lateral distance between them is less than 10% of the width of the respective recognized vehicle; whether or not the direction of the acquired side shadow underneath a vehicle is nearly in parallel with the direction of the respective vehicle side edge (for example, the angle difference of the two directions is less than 5 degrees); and, whether or not the distance between the acquired side shadow underneath a vehicle and the vehicle side edge of each of the recognized vehicles is greater than ⅓ of the height of the respective recognized vehicle and less than ⅔ of the height of the respective recognized vehicle.

Finally, in step S34, if it is judged that the acquired side shadow underneath a vehicle and the vehicle side edge of the recognized vehicle meet the above conditions, the coordinates of the acquired side shadow underneath a vehicle and the vehicle side edge of each of the recognized vehicles are extracted, and the side image coordinate information of each of the recognized vehicle is determined based on the extracted side shadow underneath a vehicle and the extracted vehicle side edge of each of the recognized vehicles. Particularly, the side image coordinate information of the respective recognized vehicle is the union of the coordinates of the extracted side shadow underneath a vehicle and the extracted vehicle side edge of the respective recognized vehicle.

Figure 5A:
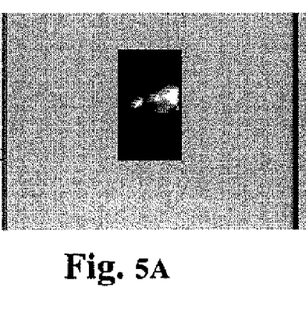
FIG. 5A shows a vehicle side image picked up by a camera apparatus.
Figure 5B:
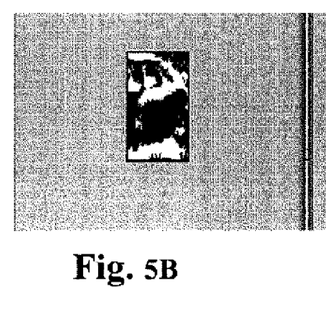
FIG. 5B shows a side shadow underneath a vehicle and the edges of a vehicle side acquired by filtering processing.
Figure 5C:
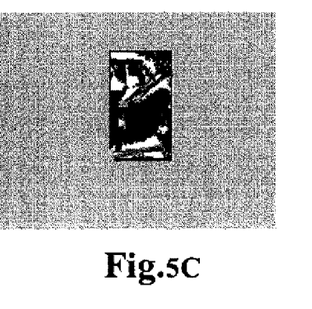
FIG. 5C shows the extracted side shadow underneath a vehicle and the edges of a vehicle side.

FIG. 5A shows a vehicle side image picked up by the camera apparatus, FIG. 5B shows a side shadow underneath a vehicle and the vehicle side edge acquired by the filtering processing of the above steps S31 and S32, and FIG. 5C shows the extracted side shadow underneath a vehicle and the vehicle side edge extracted by the filtering processing of the above step S34.

Figure 6:
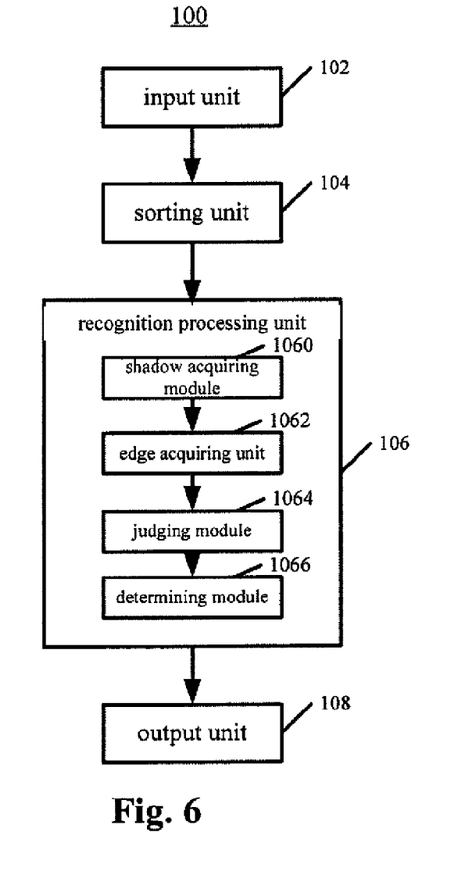
FIG. 6 is a block diagram of a vehicle side image recognition apparatus according to an embodiment of the invention.

FIG. 6 is a block diagram of a vehicle side image recognition apparatus according to an embodiment of the invention. As shown in FIG. 6, a vehicle side image recognition apparatus 100 comprises an input unit 102 for inputting images containing recognized vehicles captured by a camera apparatus mounted on an object vehicle; a sorting unit 104 for sorting images with the recognized vehicles located at left and right sides of the object vehicle from the input images; a recognition processing unit 106 for performing a vehicle side image recognition processing on the sorted images to acquire side image information of each of the recognized vehicles; and an output unit 108 for outputting the acquired side image information of each of the recognized vehicles.

The recognition processing unit 106 further comprises a shadow acquiring module 1060 for performing filtering processing on the left and right sides for each of the recognized vehicles in the sorted images to acquire the side shadow underneath each of the recognized vehicles; an edge acquiring unit 1062 for performing vehicle side edge filtering processing in the direction of the acquired side shadow underneath each of the recognized vehicles in the sorted images, to acquire the vehicle side edge of each of the recognized vehicles; a judging module 1064 for judging whether the acquired side shadow underneath a vehicle and the acquired vehicle side edge of each of the recognized vehicles meet the following conditions, whether or not the lateral distance between the acquired side shadow underneath a vehicle and the vehicle side edge of the recognized vehicle is less than 10% of the width of the respective recognized vehicle; whether or not the angle difference between the directions of the acquired side shadow underneath a vehicle and the acquired vehicle side edge of the recognized vehicle is less than 5 degrees; and whether or not the distance between the acquired side shadow underneath a vehicle and the acquired vehicle side edge of the recognized vehicle is larger than ⅓ of the height of the respective recognized vehicle and less than ⅔ of the height of the respective recognized vehicle; and a determining module 1066 for determining coordinate information of the side image of each of the recognized vehicles based on the coordinates of the side shadow underneath a vehicle and the vehicle side edge of the recognized vehicle when the judgment result is "yes".

Two applications of the vehicle side image recognition method of the present invention will be described hereinafter.

The first application is a vehicle headlights misrecognition detection method using the vehicle side image recognition method of the present invention.

An existing vehicle image recognition algorithm for recognizing a vehicle based on the structure, profile, and headlights of a vehicle will frequently misrecognize a vehicle side that reflects vehicle headlights as a vehicle, due to similarities between the horizontal structure of a vehicle side and the horizontal structure of a vehicle front face and there are similarities between vehicle headlights reflected on the vehicle side and vehicle headlights directly seen at night. However, this kind of misrecognition can be detected by using the vehicle side image recognition method of the present invention.

Figure 7:
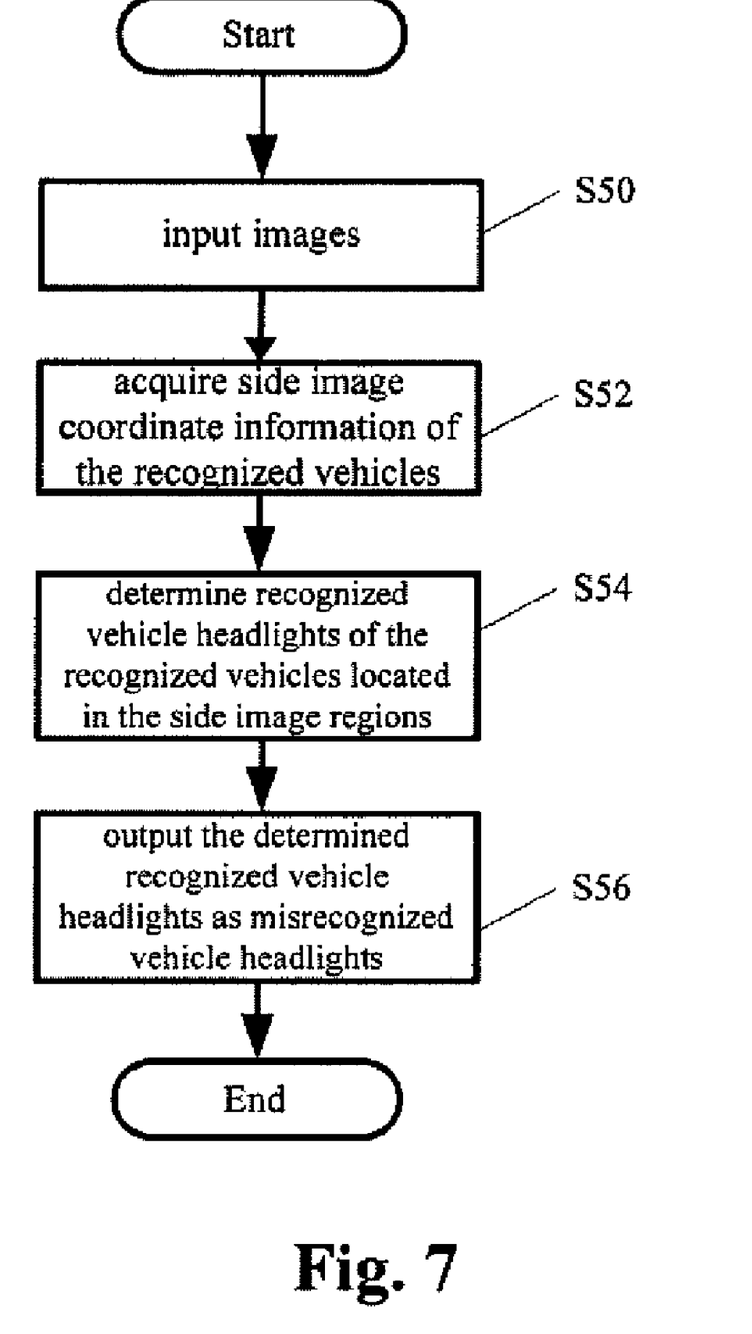
FIG. 7 is a flow chart of a vehicle headlights misrecognition detection method according to an embodiment of the invention.

FIG. 7 is a flow chart of a vehicle headlights misrecognition detection method according to an embodiment of the invention. As shown in FIG. 7, in step S50, images of recognized vehicle headlights and images containing recognized vehicles captured by a camera apparatus mounted on an object vehicle are input.

In step S52, the above steps S1-S4 and S31-S34 are performed on the input images containing the recognized vehicles, to acquire side image coordinate information of each of the recognized vehicles.

In step S54, the recognized vehicle headlights of the recognized vehicles located in the side image regions are determined based on the input images of the recognized vehicle headlights and the acquired side image coordinate information of each of the recognized vehicles.

In step S56, the determined recognized vehicle headlights are output as misrecognized vehicle headlights.

The second application is a vehicle traveling security prediction method using the vehicle side image recognition method of the invention.

The side image information of vehicles acquired by recognizing vehicle side images can enable an assisted driving system to understand information of other vehicles' driving directions by analyzing the direction of the vehicle side, so that the assisted driving system is able to analyze the relative movement of an object vehicle and other vehicles more comprehensively, thus greatly improving the traveling security of the vehicle.

Figure 8:
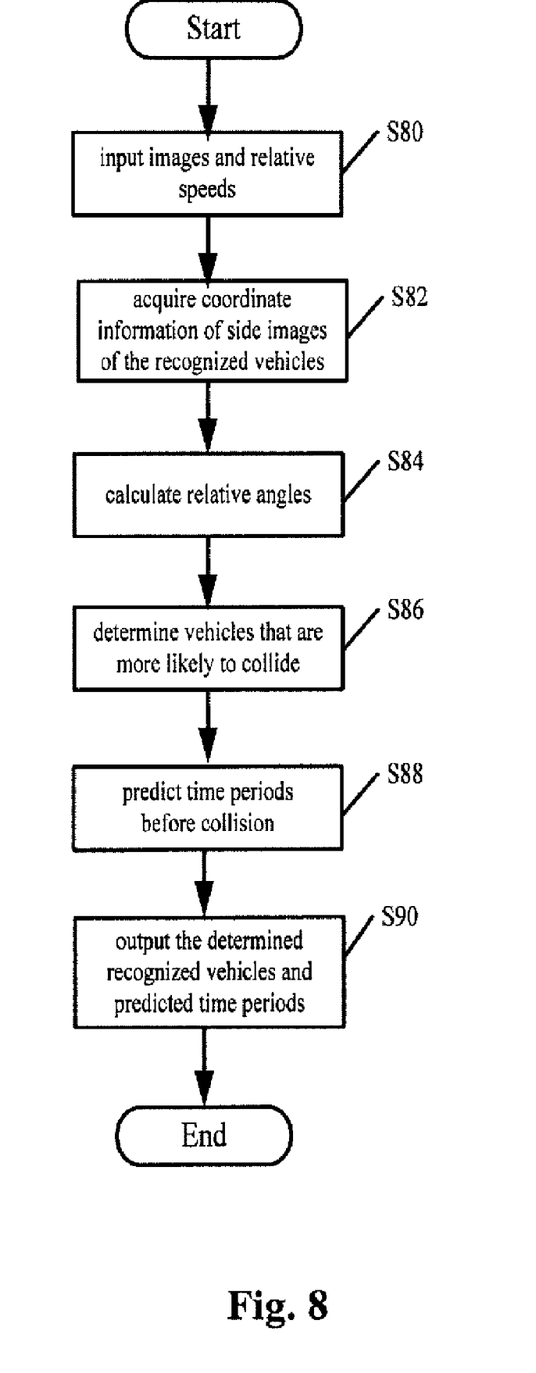
FIG. 8 is a flow chart of a vehicle traveling security prediction method according to an embodiment of the invention.

FIG. 8 is a flow chart of a vehicle traveling security prediction method according to an embodiment of the invention. As shown in FIG. 8, in step S80, images containing recognized vehicles captured by a camera apparatus mounted on an object vehicle and speeds of the object vehicle relative to the recognized vehicles are input.

In step S82, the above steps S1-S4 and S31-S34 are performed on the input images containing the recognized vehicles, to acquire coordinate information of a side image of each of the recognized vehicles.

In step S84, an angle of the object vehicle relative to each of the recognized vehicles located behind the object vehicle is calculated based on the acquired coordinate information of the side image of each of the recognized vehicles.

In step S86, recognized vehicles which are located behind the object vehicle and are more likely to collide with the object vehicle are determined according to the calculated angles.

In step S88, time periods before each of the determined recognized vehicles collides with the object vehicle are predicted.

In step S90, the determined recognized vehicles and the predicted time periods are output.

Although the above described embodiments use a camera apparatus mounted on an object vehicle as an example to illustrate the invention, the invention is not limited to that. In practice, in the present invention, the camera apparatus can be mounted on a stationary object to capture images of the road status.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle side image recognition method, comprising:
inputting images containing recognized vehicles captured by a camera apparatus;
sorting images with the recognized vehicles located at left and right sides of the camera apparatus from the input images;
performing vehicle side image recognition processing on the sorted images to acquire side image information of each of the recognized vehicles; and
outputting the acquired side image information of each of the recognized vehicles;
wherein the act of performing vehicle side image recognition processing further comprises:
acquiring a side shadow underneath each of the recognized vehicles from the left and right sides in the sorted images,
acquiring a vehicle side edge of each of the recognized vehicles along the direction of the side shadow underneath each of the recognized vehicles in the sorted images;
determining side image coordinate information of each of the recognized vehicles based on coordinates of the acquired side shadow underneath a vehicle and the acquired vehicle side edge of the recognized vehicle.

2. The method according to claim 1, further comprising:
judging whether an angle difference between the direction of the acquired side shadow underneath a vehicle and that of the acquired vehicle side edge of the recognized vehicle is within a predetermined range; and
wherein the determining act comprises determining the side image coordinate information of the recognized vehicle based on the coordinates of the side shadow underneath the vehicle and the vehicle side edge of the recognized vehicle, if the judgment result is yes.

3. The method according to claim 2, wherein the predetermined range is less than approximately 5 degrees.

4. The method according to claim 1, further comprising:
judging whether a distance between the side shadow underneath a vehicle and the vehicle side edge of the recognized vehicle is within a predetermined range; and
wherein the determining act comprises determining the side image coordinate information of the recognized vehicle based on coordinates of the side shadow underneath the vehicle and the vehicle side edge of the recognized vehicle, if the judgment result is yes.

5. The method according to claim 4, wherein the predetermined range is greater than ⅓ of the height of the recognized vehicle and less than ⅔ of the height of the recognized vehicle.

6. The method according to claim 1, further comprising:
judging whether a lateral distance between the side shadow underneath a vehicle and the vehicle side edge of the recognized vehicle is within a predetermined range; and
wherein the determining act comprises determining the side image coordinate information of the recognized vehicle based on coordinates of the side shadow underneath a vehicle and the vehicle side edge of the recognized vehicle, if the judgment result is yes.

7. The method according to claim 6, wherein the predetermined range is less than 10% of the width of the recognized vehicle.

8. The method according to claim 1, wherein the camera apparatus is mounted on one of an object vehicle or a stationary object.

9. A vehicle side image recognition apparatus, comprising:
an input unit for inputting images containing recognized vehicles captured by a camera apparatus;
a sorting unit for sorting images having recognized vehicles located at left and right sides of the camera apparatus from the input images;
a recognition processing unit for performing vehicle side image recognition processing on the sorted images to acquire side image information of each of the recognized vehicles; and
an output unit for outputting the acquired side image information of each of the recognized vehicles;
wherein the recognition processing unit further comprises:
a shadow acquiring module for acquiring a side shadow underneath each of the recognized vehicles from the left and right sides in the sorted images,
an edge acquiring unit for acquiring a vehicle side edge of each of the recognized vehicles along the direction of the side shadow underneath each of the recognized vehicles in the sorted images; and
a determining module for determining side image coordinate information of each of the recognized vehicles based on coordinates of the acquired side shadow underneath the vehicle and the acquired vehicle side edge of the recognized vehicle.

10. The apparatus according to claim 9, wherein the recognition processing unit further comprises a judging module for judging whether an angle difference between the direction of the acquired side shadow underneath a vehicle and that of the acquired vehicle side edge of the recognized vehicle is within a predetermined range; and
when the judgment result is yes, the determining module determines the side image coordinate information of the recognized vehicle based on the coordinates of the side shadow underneath the vehicle and the vehicle side edge of the recognized vehicle.

11. The apparatus according to claim 9, wherein the recognition processing unit further comprises a judging module for judging whether a distance between the side shadow underneath a vehicle and the vehicle side edge of the recognized vehicle is within a predetermined range; and
when the judgment result is yes, the determining module determines the side image coordinate information of the recognized vehicle based on coordinates of the side shadow underneath the vehicle and the vehicle side edge of the recognized vehicle.

12. The apparatus according to claim 9, wherein the recognition processing unit further comprises a judging module for judging whether a lateral distance between the side shadow underneath a vehicle and the vehicle side edge of the recognized vehicle is within a predetermined range; and
when the judgment result is yes, the determining module determines the side image coordinate information of the recognized vehicle based on coordinates of the side shadow underneath the vehicle and the vehicle side edge of the recognized vehicle.

13. A vehicle headlight misrecognition detection method, comprising:
inputting images of recognized vehicle headlights and images containing recognized vehicles captured by a camera apparatus;
acquiring coordinate information of a side image of each of the recognized vehicles based on the input images containing the recognized vehicles;
determining recognized vehicle headlights that are located in side image regions of the recognized vehicles based on the images of the recognized vehicle headlights and the coordinate information of the side image of each of the recognized vehicles; and
outputting the determined recognized vehicle headlights as misrecognized vehicle headlights;
wherein the acquiring act further comprises:
sorting images with the recognized vehicles located at left and right sides of the camera apparatus from the input images containing the recognized vehicles; and
performing vehicle side image recognition processing on the sorted images to acquire the coordinate information of the side image of each of the recognized vehicles;
wherein the act of performing vehicle side image recognition processing further comprises:
acquiring a side shadow underneath each of the recognized vehicles from the left and right sides in the sorted images,
acquiring a vehicle side edge of each of the recognized vehicles along the direction of the side shadow underneath each of the recognized vehicles in the sorted images; and
determining the side image coordinate information of each of the recognized vehicles based on coordinates of the side shadow underneath the vehicle and the vehicle side edge of the recognized vehicle.

14. A vehicle traveling security prediction method, comprising:

inputting images containing recognized vehicles captured by a camera apparatus mounted on an object vehicle, and a speed of the object vehicle relative to each of the recognized vehicles;

acquiring coordinate information of a side image of each of the recognized vehicle based on the input images containing the recognized vehicles;

calculating an angle of the object vehicle relative to each of recognized vehicles located behind the object vehicle based on the coordinate information of the side image of each of the recognized vehicles;

determining recognized vehicles which are located behind the object vehicle and may collide with the object vehicle based on the calculated angles;

predicting time periods before each of the determined recognized vehicles collide with the object vehicle; and outputting the determined recognized vehicles and the predicted time periods;

wherein the acquiring act further comprises:

sorting images with the recognized vehicles located at left and right sides of the camera apparatus from the input images containing the recognized vehicles; and performing vehicle side image recognition processing on the sorted images to acquire the coordinate information of the side image of each of the recognized vehicles;

wherein the act of performing vehicle side image recognition processing further comprises:

acquiring a side shadow underneath each of the recognized vehicles from the left and right sides in the sorted images, acquiring a vehicle side edge of each of the recognized vehicles along the direction of the side shadow underneath each of the recognized vehicles in the sorted images; and determining the side image coordinate information of each of the recognized vehicles based on coordinates of the side shadow underneath the vehicle and the vehicle side edge of the recognized vehicle.

* * * * *